S. D. REDMAN.
Animal-Tethers.
No. 224,353.        Patented Feb. 10, 1880.
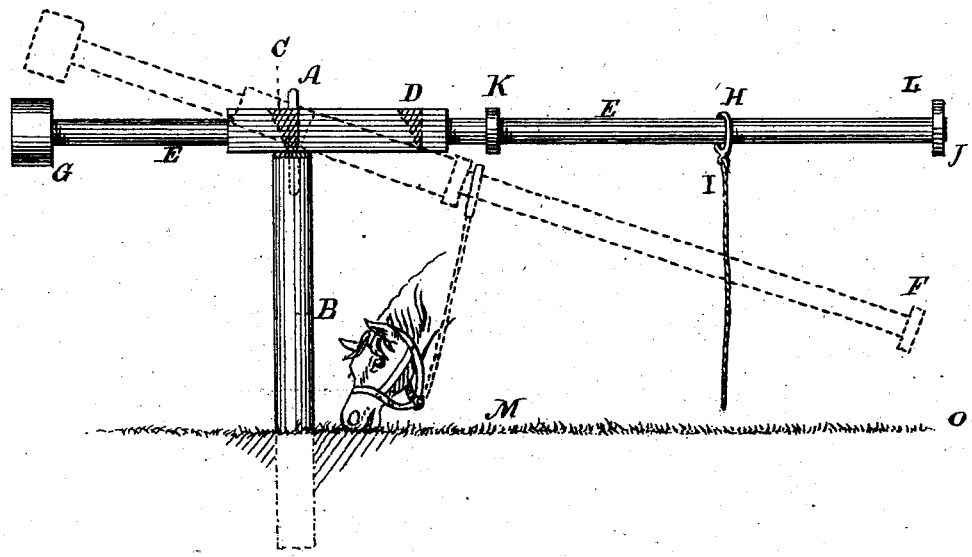

UNITED STATES PATENT OFFICE.

SELDEN D. REDMAN, OF NEWFANE, NEW YORK.

ANIMAL-TETHER.

SPECIFICATION forming part of Letters Patent No. 224,353, dated February 10, 1880.

Application filed June 27, 1879.

*To all whom it may concern:*

Be it known that I, SELDEN D. REDMAN, of the town of Newfane, in the county of Niagara and State of New York, have invented new and useful Improvements in Animal-Tethers, of which the following is a specification.

Most tethers heretofore in use exert a continual strain on the animal while feeding, caused by the weight or other device employed to take up the slack of the tether-line. In some the line, when drawn out to its greatest length, runs so near the ground as to become wet by the dew, causing it to stiffen and crinkle, preventing its running freely through the taking-up device, thus allowing the tethered animal to become dangerously entangled in the line, and in none is there any efficient method of varying the length of the long arm of the bar, so as to accommodate the tether to move in less-confined limits of space.

To avoid or overcome these difficulties is the object of my invention, of which the following is a full description, reference being had to the accompanying drawing.

In the figure of the drawing, B is a post of suitable length set in the ground, in the top of which is a fixed bolt, A, which passes through a diverging slot, C or D, in the rotating bar E, and secures it to the post. The slots C D closely fit the bolt on the under side of the bar, and from thence diverge to the upper side in the shorter arm of the bar just sufficiently to allow the long arm of the bar to dip to any desired point, say F. The side of the slots next to the long arm should be about perpendicular to the bar, so that the arm, when at rest, may form a right angle with the post.

The degree of dip and elevation may be varied by varying the divergence and direction of the slots.

On the short arm of the bar is a movable weight, G, sufficient to balance it back as far as the regulating-slots will permit. On the long arm is placed a ring or link, H, plain, or combined with rolls or pulleys to relieve friction, to which is attached the tether-line I. At the end J, and at other suitable points, are placed rings or pins K L, which act as stops to prevent the ring passing beyond these points.

The rings K or L may be movable, in which case only one is required.

If desired, the bar may be reversed by cutting the slots in a reversed way from that here described.

The operation of the tether is as follows: Suppose the ring H to be at K. The tethered animal can then graze freely in a limited space at M without straining on the tether-line I. As he moves toward the post B he pulls upon the line and causes the long arm of the bar E to be depressed to F, lower than which it cannot go on account of the stop-slot C, and permits him to graze as far as the post B, but no farther in that direction, though he can move freely in any other course. As he moves outward from the post the bar rises to its original position, the ring H moves easily to J, and as he passes beyond the point O the bar is again depressed to F, and he is allowed to reach a point on the outer limit of the circle, the diameter of which is nearly double the united length of the long arm of the bar and the tether-line, anywhere within which the tethered animal can move freely and safely in any direction. In this case the stop L is not used.

To shorten the long arm, and hence lessen the diameter of the grazing-circle, the bar E is suspended at the slot D. The same object may be obtained by securing to the side of the bar a strip of wood or metal with slots similar to those above described.

The length of the bar E, the position of the weight G, and the number and location of the slots C D may be varied as desired. In changing the point of suspension of the bar the distance between that point and the movable stop K must not be lessened.

What I claim is—

1. In rotating tethers, the adjustable bar E, carrying the ring H and stop K, as described.

2. In an animal-tether, the regulating-slots C D, in combination with the fixed bolt A, by which means the degree of dip and elevation of the bar E may be controlled.

SELDEN D. REDMAN.

Witnesses:
J. W. SWINBURNE,
GEORGE FRAUENBERGER.